United States Patent
Bies et al.

(10) Patent No.: US 8,322,126 B2
(45) Date of Patent: Dec. 4, 2012

(54) GAS TURBINE EXHAUST ASSEMBLY

(75) Inventors: Christopher J. Bies, Indianapolis, IN (US); Stephen A. Bergeron, Indianapolis, IN (US); Bryan H. Lerg, Westfield, IN (US); Emil R. Dejulio, Columbus, IN (US)

(73) Assignee: Rolls-Royce North American Technologies, Inc., Indianapolis, IN (US)

( * ) Notice: Subject to any disclaimer, the term of this patent is extended or adjusted under 35 U.S.C. 154(b) by 1203 days.

(21) Appl. No.: 12/154,510

(22) Filed: May 23, 2008

(65) Prior Publication Data

US 2009/0288388 A1 Nov. 26, 2009

(51) Int. Cl.
*F02C 7/08* (2006.01)
*F02G 1/00* (2006.01)

(52) U.S. Cl. .......... 60/39.5; 60/770; 60/264; 239/127.3; 239/265.13

(58) Field of Classification Search .................. 60/39.5, 60/770, 264; 239/127.3, 265.13
See application file for complete search history.

(56) References Cited

U.S. PATENT DOCUMENTS

| | | | |
|---|---|---|---|
| 3,921,906 A | 11/1975 | Nye et al. | |
| 4,007,587 A | 2/1977 | Banthin et al. | |
| 4,018,046 A * | 4/1977 | Hurley | 60/264 |
| 4,198,817 A | 4/1980 | Fujita et al. | |
| 4,215,537 A * | 8/1980 | Hurley | 60/264 |
| 4,295,332 A | 10/1981 | Steyer et al. | |
| 5,699,662 A | 12/1997 | Born et al. | |
| 6,134,879 A | 10/2000 | Frawley et al. | |
| 6,253,540 B1 | 7/2001 | Chew et al. | |
| 6,988,674 B2 | 1/2006 | Steyer et al. | |
| 7,607,306 B2 * | 10/2009 | Steyer et al. | 60/770 |
| 2006/0179815 A1 | 8/2006 | Means | |
| 2007/0028623 A1 | 2/2007 | Steyer et al. | |

* cited by examiner

*Primary Examiner* — William H Rodriguez
(74) *Attorney, Agent, or Firm* — Krieg DeVault LLP

(57) ABSTRACT

An exhaust device is disclosed that includes a duct that turns an exhaust flow from a gas turbine engine from a first direction to a second direction. A diverter cup is disposed within the duct and serves to split the exhaust flow into two streams as well as introduce cooling air through an ejector pump at the downstream end of the diverter cup. A splitter is disposed downstream of the diverter cup and serves to split the cooling air into two streams which are thereafter mixed with the split exhaust flow. A diffuser is created in the exhaust device between the duct and the splitter. Various cooling slots are also provided in the duct.

20 Claims, 3 Drawing Sheets

GAS TURBINE EXHAUST ASSEMBLY

FIELD OF THE INVENTION

The present invention generally relates to gas turbine engine exhaust systems, and more particularly, but not exclusively, to devices used for gas turbine exhaust systems.

BACKGROUND

Gas turbine engines often produce high exhaust gas temperatures when operated. An infrared signature develops as a result of the operation which may be used by an enemy's air defenses to identify, track, harass, and/or harm an aircraft or other vehicle that is operating with a gas turbine engine. Improving engine exhaust arrangements to reduce, mitigate, or eliminate high exhaust gas temperatures remains an area of interest. Unfortunately, some existing systems have various shortcomings relative to certain applications. Accordingly, there remains a need for further contributions in this area of technology.

SUMMARY

One embodiment of the present invention is a unique engine exhaust suppression system. Other embodiments include apparatuses, systems, devices, hardware, methods, and combinations for engine exhaust. Further embodiments, forms, features, aspects, benefits, and advantages of the present application shall become apparent from the description and figures provided herewith.

DETAILED DESCRIPTION OF THE ILLUSTRATIVE EMBODIMENTS

Figure 1:
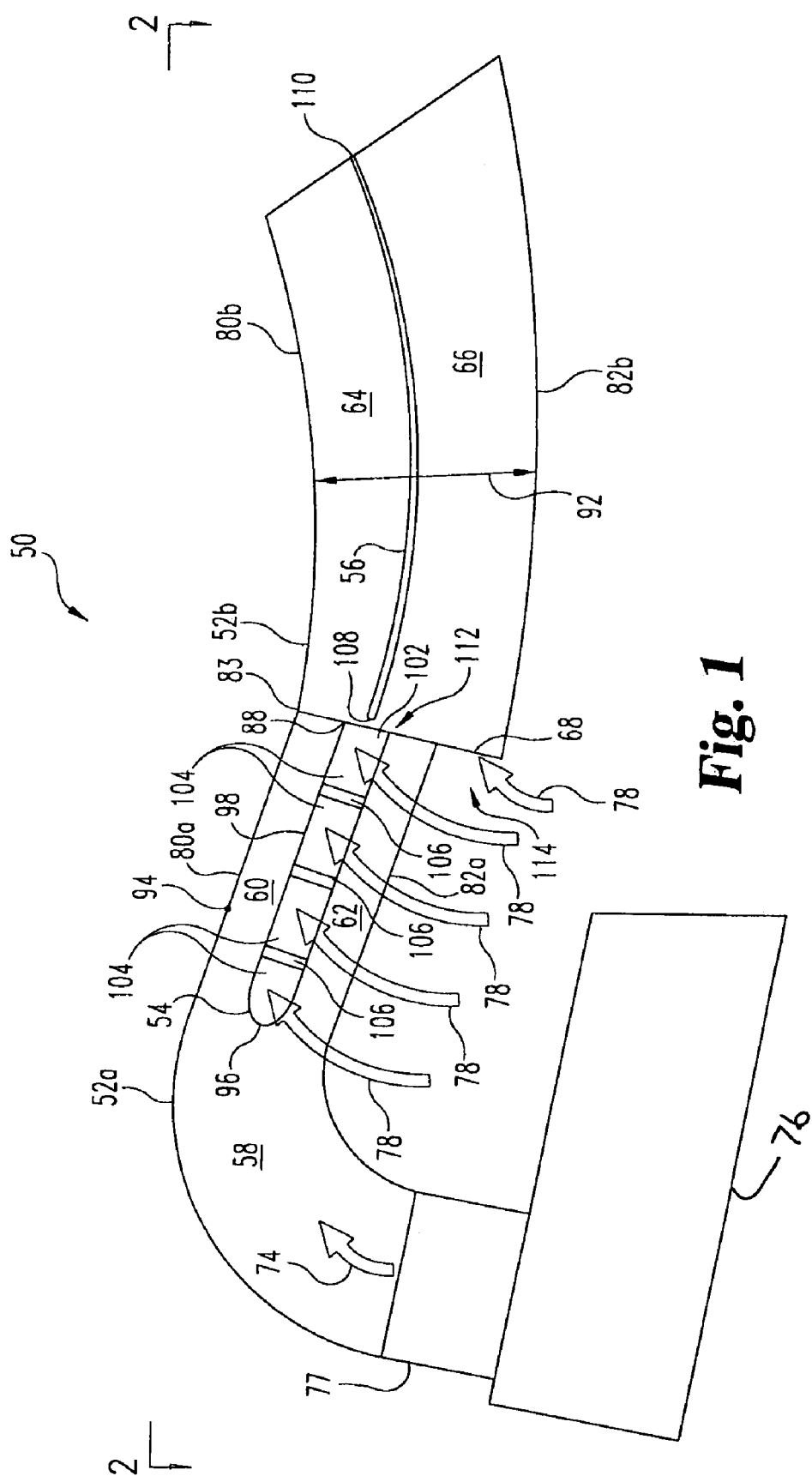
FIG. 1 is a partial schematic side view of one embodiment of the present application.

For the purposes of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

Figure 2:
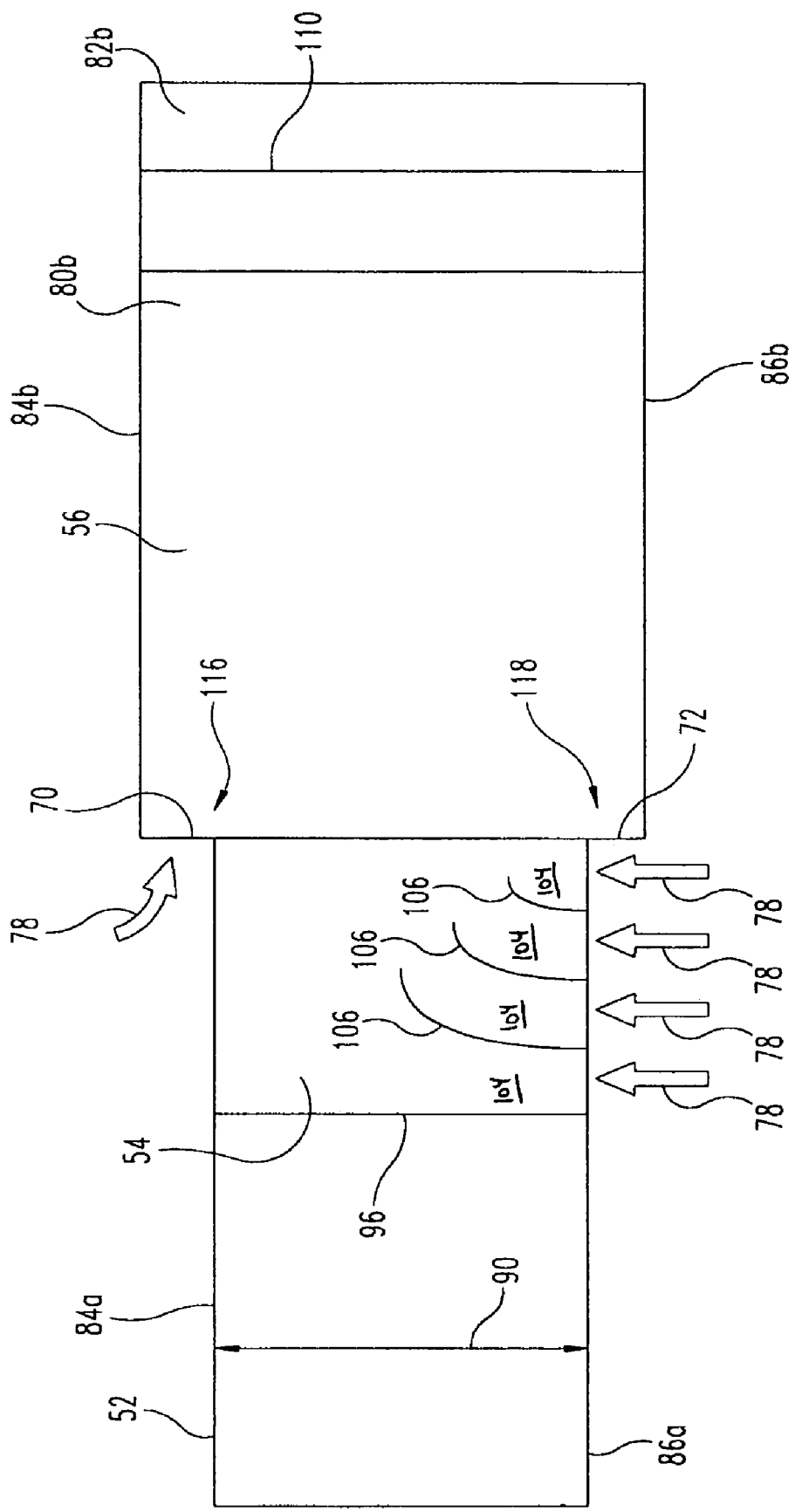
FIG. 2 is a partial schematic top view of one embodiment of the present application.
Figure 3:
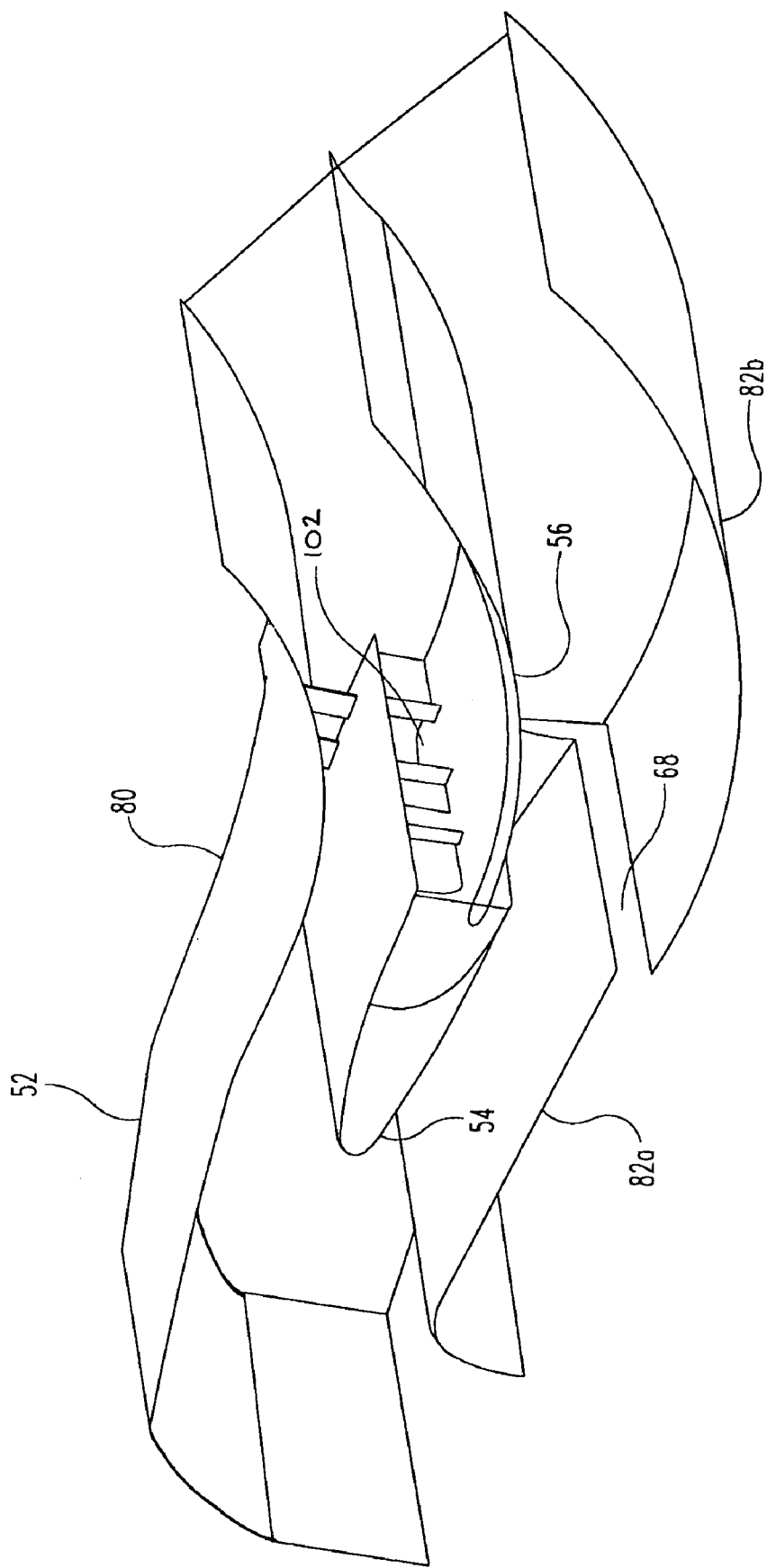
FIG. 3 is a partial perspective view of one embodiment of the present application.

With reference to FIGS. 1, 2, and 3, a side, top, and perspective view are shown of an exhaust assembly 50 which can be useful for redirecting exhaust flow from a gas turbine engine 76. In some applications, the exhaust assembly 50 may be used on an aircraft to cool an exhaust flow from the gas turbine engine 76 and/or otherwise reduce an infrared signature of the engine. As used herein, the term "aircraft" includes, but is not limited to, helicopters, airplanes, unmanned space vehicles, fixed wing vehicles, variable wing vehicles, rotary wing vehicles, hover crafts, vehicles, and others. Further, the present inventions are contemplated for utilization in other applications that may not be coupled with an aircraft such as, for example, industrial applications, power generation, pumping sets, naval propulsion and other applications known to one of ordinary skill in the art.

The exhaust assembly 50 includes ducts 52a and 52b, a diverter cup 54, and a splitter 56. In some embodiments, the ducts 52a and 52b may be formed as one integral duct. In other embodiments, additional ducts may also be included. The diverter cup 54 and splitter 56 are disposed within the ducts 52a and 52b and together the assembly 50 operates to change the direction of and/or cool the exhaust flow from the gas turbine engine 76. The gas turbine engine 76 depicted in FIG. 1 is a turboshaft engine suitable for helicopter applications, but could be any other type of gas turbine engine suitable any application.

A number of passageways 58, 60, 62, 64, and 66 within the exhaust assembly 50 are formed by the relative orientation of the ducts 52a and 52b, the diverter cup 54, and the splitter 56. As an exhaust stream 74 exits the gas turbine engine 76 from one direction it is turned in the passageway 58 to flow in another direction as it continues down the length of the ducts 52a and 52b. In some embodiments, however, the passageway 58 may not be provided such that the exhaust stream 74 flows within the ducts 52a and 52b in generally the same direction as it had when exiting the gas turbine engine 76. After being turned in passageway 58, the exhaust stream 74 is split in to two parts by the diverter cup 54. In some embodiments the exhaust stream is evenly split by the diverter cup 54, while in other embodiments the exhaust stream 74 is unevenly split The flow split is further maintained by the splitter 56 located downstream of the diverter cup 54. The relative orientation of the ducts 52a and 52b and splitter 56 maintains the split in the exhaust flow with the passageways 64 and 66 which are in fluid communication with the passageways 60 and 62, respectively.

In addition to the various passageways, cooling slots 68, 70, and 72 are also defined in the ducts 52a and 52b and provide for an introduction of cooling air 78 into the ducts 52a and 52b. The cooling air 78 is ambient air in the illustrated embodiment but may also come from other sources. In addition, the cooling air 78 that enters at different locations within the exhaust assembly 50 may come from different sources and may have a variety of temperatures and pressures.

An exhaust collector 77 is disposed between the gas turbine engine 76 and the exhaust assembly 50. In some embodiments, the exhaust collector 77 may be included in the exhaust assembly 50, while in other embodiments the exhaust collector 77 forms part of the gas turbine engine 76. In other embodiments, the exhaust collector 77 may not be needed, in which case the ducts 52a and 52b may attach directly to the gas turbine engine 76.

In one form the ducts 52a and 52b have a rectangular cross section and provides a passageway for a mixture of the exhaust stream 74 and the cooling air 78 to flow. The ducts may have other cross sectional shapes in other embodiments. For example, some embodiments of the ducts 52a and 52b may have a circular cross section near the gas turbine engine 76 and then transition to a rectangular cross section further down the length of the ducts 52a and 52b. In some embodiments, the ducts 52a and 52b may have other shapes along the length of the ducts 52a and 52b, such as a substantially circular duct to set forth just one non-limiting example. The cross sectional area of the ducts 52a and 52b may be either constant or may vary along the length of the ducts 52a and 52b as will be discussed further hereinbelow.

It should be noted at this point that FIG. 1 is primarily a planar depiction of one view of the exhaust assembly 50, but the reference numeral 78, which corresponds to the cooling air entering the diverter cup 54, are drawn with a curvature to indicate that cooling air enters from some direction that is outside of the plane of FIG. 1. Therefore, the cooling air 78 does not enter through bottom surfaces 82a and 82b nor does it necessarily cross the passageway 62 in a curvilinear manner. Rather, the cooling air 78 enters from the non-planar direction just described. FIG. 2 depicts the cooling air 78 entering the diverter cup 54 from the sides.

The ducts 52a and 52b include top surfaces 80a and 80b, bottom surfaces 82a and 82b, and side surfaces 84a, 84b and 86a, 86b, which together define a width 90 and a depth 92 that may vary along the curvilinear length of the ducts 52a and 52b. In some embodiments, the top surfaces 80a and 80b may be formed as one integral top surface, but in other embodiments, additional top surfaces may also be included. The same is true of the bottom surfaces and the side surfaces. Specifically, in some embodiments, the bottom surfaces 82a and 82b may be formed as one integral bottom surface, while in other embodiments, additional bottom surfaces may also be included. In further embodiments, side surfaces 84a and 84b may be formed as one integral side surface, but in other embodiments, additional side surfaces may also be included. Finally, in some embodiments, side surfaces 86a and 86b may be formed as one integral side surface, while in other embodiments, additional side surfaces may also be included. Though depicted as smooth shapes in the illustrative embodiment, in some embodiments the surfaces 80a, 80b, 82a, 82b, 84a, 84b, 86a, and 86b may not be a continuous shape or may not be smooth. For example, the top surfaces 80a and 80b may have a kink, or abrupt bend, somewhere along its length. In some forms, either or both of the width 90 and depth 92 may be substantially constant along the length. As used herein, the terms "top", "bottom", and "sides" are used for purposes of reference only and do not necessarily describe the relative orientation of the exhaust assembly 50 as it might be installed on a vehicle such as an aircraft.

The first duct section 52a includes the top surface 80a, the bottom surface 82a, and the side surfaces 84a and 86a. Likewise, the second duct section 52b includes the top surface 80b, the bottom surface 82b, and the side surfaces 84b and 86b. A transition 83 from the first duct section 52a to the second duct section 52b occurs near a trailing edge 88 of the diverter cup 54 in the illustrated embodiment. The transition 83 is either an area where one of the duct sections ends and the other begins, or an arbitrary boundary from one portion of the ducts 52a and 52b to the other, depending on whether the ducts 52a and 52b are composed of distinct parts or is an integral whole. In other embodiments, however, the transition 83 from the first duct section 52a to the second duct section 52b may occur further upstream, or further downstream, than the trailing edge 88 of the diverter cup 54. The transition 83 from the top surface 80a to the top surface 80b may be located at the same stream position or may be either upstream or downstream of the transition 83 between the bottom surfaces 82a and 82b. Though the transition 83 between the first duct section 52a and the second duct section 52b is depicted as a straight line in both FIG. 1 and FIG. 2, other shapes are also contemplated. For example, the transition may be curvilinear or piecewise linear, to set forth just two non-limiting examples.

Any of the surfaces 80a, 80b, 82a, 82b, 84a, 84b, 86a, and 86b may be attached using a variety of techniques, such as welding, bolting, and riveting, to set forth just a few non-limiting embodiments. In some embodiments, the surfaces may be integrally formed, depending on the application or particular embodiment.

The top surfaces 80a and 80b are joined together as viewed in FIG. 1 at the transition 83, but the bottom surfaces 82a and 82b are not joined. When the surfaces are joined together, they may be permanently connected such as through a process like welding, or they may be releasably connected such as through a mechanical coupling like a hinge. The bottom surfaces 82a and 82b form the cooling slot 68. In some embodiments, the top surfaces 80a and 80b may not be joined which may result in the formation of a cooling slot as is formed between the bottom surfaces 82a and 82b. In other embodiments, the bottom surfaces 82a and 82b may be joined thus eliminating the cooling slot 68. Furthermore, some surfaces may be joined over portions of their length. To set forth just one example, the top surfaces 80a and 80b may be joined only over parts of their lengths. Both sets of side surfaces, i.e. 84a, 84b, 86a, and 86b, are not joined thus forming the cooling slots 70 and 72. In similar fashion to the surfaces 80a, 80b and 82a, 82b, the side surfaces 84a, 84b and/or 86a, 86b may either be joined in some embodiments, or may be joined over only portions of their respective lengths. For example, either or both sets of the side surfaces 84a, 84b and 86a, 86b may be joined thus eliminating either or both of the cooling slots 70 and 72.

The ducts 52a and 52b as viewed in FIG. 1 are curvilinear in shape and include a point of inflection 94 near the diverter cup 54. Though FIG. 2 does not depict as such, the ducts may also be curvilinear in other views as well. The curvilinear shape of the ducts 52a and 52b cause the exhaust stream 74 to turn from a first direction associated with exiting the gas turbine engine 76 to a second direction. The curvilinear shape of the ducts 52a and 52b also cause the exhaust stream 74 to further turn as it continues down the length of the ducts 52a and 52b. Some embodiments may have the ducts 52a and 52b with a substantially linear shape such that minimal flow turning occurs. The point of inflection 94 can be defined as either the point at which the curvilinear shape changes direction or the point at which the tangent to the curve crosses the curve itself. In one form, the point of inflection 94 is the same for the top surfaces 80a and 80b and the bottom surfaces 82a and 82b, but may be different in other embodiments. Though only one point of inflection is depicted in the ducts 52a and 52b of the illustrative embodiment, other embodiments may include more than one point of inflection.

The diverter cup 54 includes a leading edge 96, an upper surface 98, a lower surface 100, and an aperture 102 formed in the trailing area. The diverter cup 54 includes a shape similar to a symmetric airfoil shape in the illustrative embodiment. In other embodiments, however, the shape of diverter cup 54 may be non-symmetric and may furthermore not resemble an airfoil. The diverter cup 54 extends across the width 90 of the ducts 52a and 52b as seen in FIG. 2, but in some embodiments may only partially extend across the ducts 52a and 52b. Furthermore, though the diverter cup 54 is located within the first duct section 52a in the illustrative embodiment, it may also be located elsewhere. The upper surface 98 and the lower surface 100 extend along the flow stream and terminate at roughly the same location, but in some embodiments the upper surface 98 may terminate at a location either upstream or downstream of the lower surface 100. The distance between the upper surface 98 and the lower surface 100, which may also be referred to as the thickness, may vary along the length of the diverter cup 54. The leading edge 96 has a blunt shape but may take on other forms in different embodiments.

The aperture 102 is in fluid communication with passageways 104 that are defined between the upper surface 98 and the lower surface 100 and which are separated by members 106. All passageways 104 lead to a common aperture 102 in the illustrative embodiment, but in other embodiments the passageways may lead to individual apertures. In still other embodiments, some passageways may be paired in groups with individual apertures. In operation, the cooling air 78 that enters the passageways 104 is ducted through the diverter cup 54 and flows out of the aperture 102 and into the ducts 52*a* and 52*b*. The aperture 102 extends across the width 90 of the ducts 52*a* and 52*b*, but in some embodiments the aperture 102 may extend only partially across the ducts 52*a* and 52*b*. Multiple apertures 102 may be provided in some embodiments. The aperture 102 in the illustrated embodiment, furthermore, may accommodate a variety of flow rates at a variety of temperatures and pressures. Though the cooling air 78 is depicted as entering only one side of the diverter cup 54 in FIG. 2, other embodiments may include the cooling air 78 entering on both sides.

The members 106 may be oriented in any arrangement that is appropriate to deliver the cooling air 78 through the passageways 104 to the aperture 102. For example, the members 106 may have a shape different from the generally curved shape depicted in FIG. 2. Each of the members 106 may have different sizes, shapes, and lengths, either individually or in groupings. The spacing between the members 106 may either be regular or irregular. Though only three members are depicted in FIGS. 1 and 2, some embodiments may have any number of members 106. Some embodiments may have an absence of members 106. Other structures might also be added within the diverter cup 54 to facilitate the passage of the cooling air 78.

The splitter 56 is an elongate, airfoil shape that serves to split the flow of the exhaust stream 74 and the cooling air 78 within the ducts 52*a* and 52*b*. The splitter 56 includes a leading edge 108 and a trailing edge 110 and may have any variety of thickness. The present application contemplates that the splitter 56 may have the same, less than or greater than thickness as the diverter cup 54. The splitter 56 extends from the side surface 84*b* to the side surface 86*b* in the illustrative embodiment, but other embodiments may include the splitter 56 that only partially extends across the ducts 52*a* and 52*b*. In addition, the leading edge 108 and the trailing edge 110 may extend at any angle relative to the side surfaces 84*b* and 86*b* as viewed in FIG. 2, or may take on any arbitrary shape between the surfaces 84*b* and 86*b*. The leading edge 108 of the splitter 56 is located between the upper surface 98 and the lower surface 100 of the diverter cup 54, but in some embodiments may be located in any position relative to the upper surface 98 or the lower surface 100. The leading edge 108 of the splitter 56 is located downstream of the upper surface 98 and the lower surface 100 of the diverter cup 54, but in some embodiments the leading edge 108 may be located upstream of the location in which either the upper and lower surfaces 98 and 100 terminate. Though the leading edge 108 of the splitter 56 is located within the second duct section 52*b* in the illustrative embodiment, it may also be located and/or extend into the first duct section 52*a*. The trailing edge 110 extends to the end of the ducts 52*a* and 52*b*, but may only partially extend to the end of the ducts 52*a* and 52*b* in other embodiments. As the cooling air 78 flows through the diverter cup 54 and out the aperture 102, it is split into two flow streams, one above the splitter 56 and the other below. The relative proportion of the cooling air 78 that flows above and below the splitter 56 can be determined by the relative location of the splitter 56 to the upper surface 98 and the lower surface 100 as well as flow uniformity existing within the ducts 52*a* and 52*b*.

The passageways 60 and 62 are defined between the first duct section 52*a* and the diverter cup 54 and include similar cross sectional areas, as measured transverse to the flow stream as will be understood by those skilled in the art. In some embodiments, the cross sectional area may be different and furthermore may vary along the length of the first duct section 52*a*. The passageways 64 and 66 are defined between the second duct section 52*b* and the splitter 56. The cross sectional area of the passageways 64 and 66 in the illustrated embodiment increase along the length of the ducts 52*a* and 52*b*. As will be appreciated, the increase in cross sectional area creates a diffuser through which a mixture of the exhaust stream 74 and the cooling air 78 traverses. In some embodiments, the cross sectional area of the passageway 64 may increase at a different rate along the length of the ducts 52*a* and 52*b* relative to the cross sectional area of the passageway 66. Furthermore, the cross sectional area of either or both of the passageways 64 and 66 may be constant in some embodiments.

As mentioned above, the cooling slots 68, 70, and 72 are defined in the ducts 52*a* and 52*b*, one in the bottom and two in the sides. The cooling slots 68, 70, and 72 form part of separate ejectors that are capable of entraining cooling air into the exhaust stream 74.

Ejector pumps 112, 114, 116, and 118 are created when the exhaust stream 74 traversing through the passageways 60, 62 and into the passageways 64, 66 is used as a primary flow to entrain the cooling air 78 as it enters the ducts 52*a* and 52*b*. As will be appreciated, ejector pump 112 entrains cooling air 78 from aperture 102, ejector pump 114 entrains cooling air 78 from cooling slot 68, ejector pump 116 entrains cooling air 78 from cooling slot 70, and ejector pump 118 entrains cooling air 78 from cooling slot 72.

One aspect of the present application includes an engine exhaust device having an ejector and a diffuser. The engine exhaust device includes a diverter cup disposed within an exhaust duct and serves to split an exhaust stream from a gas turbine engine. The diverter cup has an aperture at its downstream end which introduces cooling air into the duct via an ejector action, wherein the exhaust stream is the primary fluid for the ejector. A splitter is disposed within the duct and is arranged downstream of the diverter cup. The splitter serves to split the cooling air from the diverter cup into two parts, both of which mix with the split exhaust stream. The splitter may have the shape of an airfoil. A diffuser is created along the length of the exhaust device between the duct and the splitter. Cooling slots are also created in the sides of the duct to introduce additional cooling air.

In one embodiment, there is an exhaust arrangement comprising a mechanical housing, a diverter cup having a leading edge, a top, and a bottom, a splitter positioned downstream of the diverter cup between the top and the bottom, a diffuser located downstream of the leading edge of the diverter cup, and the diverter cup, the diffuser, and the splitter disposed within the mechanical housing.

In another embodiment, there is an exhaust system comprising a duct operable to convey an exhaust stream, a flow changing structure disposed within the duct and having a leading edge and a trailing exit operable to emit a flow stream, and an elongate flow device located within the duct and having at least a portion positioned aft of the trailing exit and within the flow stream when the flow changing structure is operated, the elongate flow device having a closed trailing end.

In yet another embodiment, there is an apparatus comprising a gas turbine engine and means for reducing a heat signature of the gas turbine engine.

In still yet another embodiment, there is a method comprising flowing a gas turbine engine exhaust stream within an exhaust duct, diverting the gas turbine engine exhaust stream to flow around two sides of an exhaust object, ejecting a cooling flow into the exhaust duct, and diffusing the exhaust stream.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. An exhaust arrangement comprising:
a housing;
a diverter cup having a leading edge connected to a top and a bottom;
a splitter having a leading edge positioned downstream of the diverter cup between the top and the bottom;
a diffuser located downstream of the leading edge of the diverter cup; and
the diverter cup, the diffuser, and the splitter disposed within the housing, wherein the diffuser includes a passage formed substantially along the entirety of the splitter characterized by a growth rate in a height of the passage that is greater than or equal to zero.

2. The exhaust arrangement of claim 1, which further includes an aperture formed in a downstream side of the diverter cup, wherein a flow stream is pumped from the aperture through an ejector action when the apparatus is operated.

3. The exhaust arrangement of claim 1, wherein the splitter is located aft of the diverter cup.

4. The exhaust arrangement of claim 3, wherein the diffuser includes a passage located between the housing and the splitter, the cross sectional area of the passage increasing along the length of the splitter.

5. The exhaust arrangement of claim 1, which further includes a passage defined by the housing and the splitter, wherein the length of the splitter is equal to or longer than the passage.

6. The exhaust arrangement of claim 1, wherein the housing is not symmetric.

7. The exhaust arrangement of claim 1, which further includes a cooling slot in the housing.

8. The exhaust arrangement of claim 1, wherein the housing is configured to turn flow from a first engine exit direction.

9. The exhaust arrangement of claim 1, wherein the splitter is positioned intermediate the top and the bottom of the diverter cup.

10. The exhaust arrangement of claim 1, wherein the splitter has an airfoil shape.

11. The exhaust arrangement of claim 1, wherein the splitter is curved to change a direction of a flow stream adjacent to the splitter.

12. The exhaust arrangement of claim 1, which further includes an aperture formed in a downstream side of the diverter cup, wherein a flow stream is pumped from the aperture through an ejector action when the apparatus is operated;
which further includes a cooling slot in the housing; and
wherein the splitter is curved to change a direction of a flow stream adjacent to the splitter.

13. An exhaust arrangement comprising:
a housing;
a diverter cup having a leading edge, an open trailing edge, a top, and a bottom, wherein the top and bottom commonly share the leading edge, the top extends aft from the commonly shared leading edge to a top part of the open trailing edge, the bottom extends aft from the commonly shared leading edge to a bottom part of the trailing edge;
a splitter oriented to form a diffuser with the housing, the splitter positioned entirely aft of the open trailing edge of the diverter cup and between the top and the bottom and proximate the open trailing edge; and
the diverter cup, the diffuser, and the splitter disposed within the housing.

14. The exhaust arrangement of claim 13, which further includes an aperture formed in a downstream side of the diverter cup, wherein a flow stream is capable of being pumped from the aperture.

15. The exhaust arrangement of claim 13, wherein the splitter is positioned intermediate the top and bottom of the diverter cup.

16. The exhaust arrangement of claim 13 wherein a fluid flow that is flowed through the open trailing edge is entrained with an exhaust flow through the housing when the apparatus is operated.

17. The exhaust arrangement of claim 13, which further includes a cooling slot in the housing; and wherein the housing is configured to turn flow from a first engine exit direction.

18. The exhaust arrangement of claim 17, wherein the splitter has an airfoil shape.

19. The exhaust arrangement of claim 13, wherein the splitter is curved to change a direction of a flow stream adjacent to the splitter.

20. The exhaust arrangement of claim 13, wherein a fluid flow that is flowed through the open trailing edge is entrained with an exhaust flow through the housing when the apparatus is operated;
which further includes a cooling slot in the housing; and
wherein the splitter is curved to change a direction of a flow stream adjacent to the splitter.

* * * * *